(No Model.) 3 Sheets—Sheet 2.

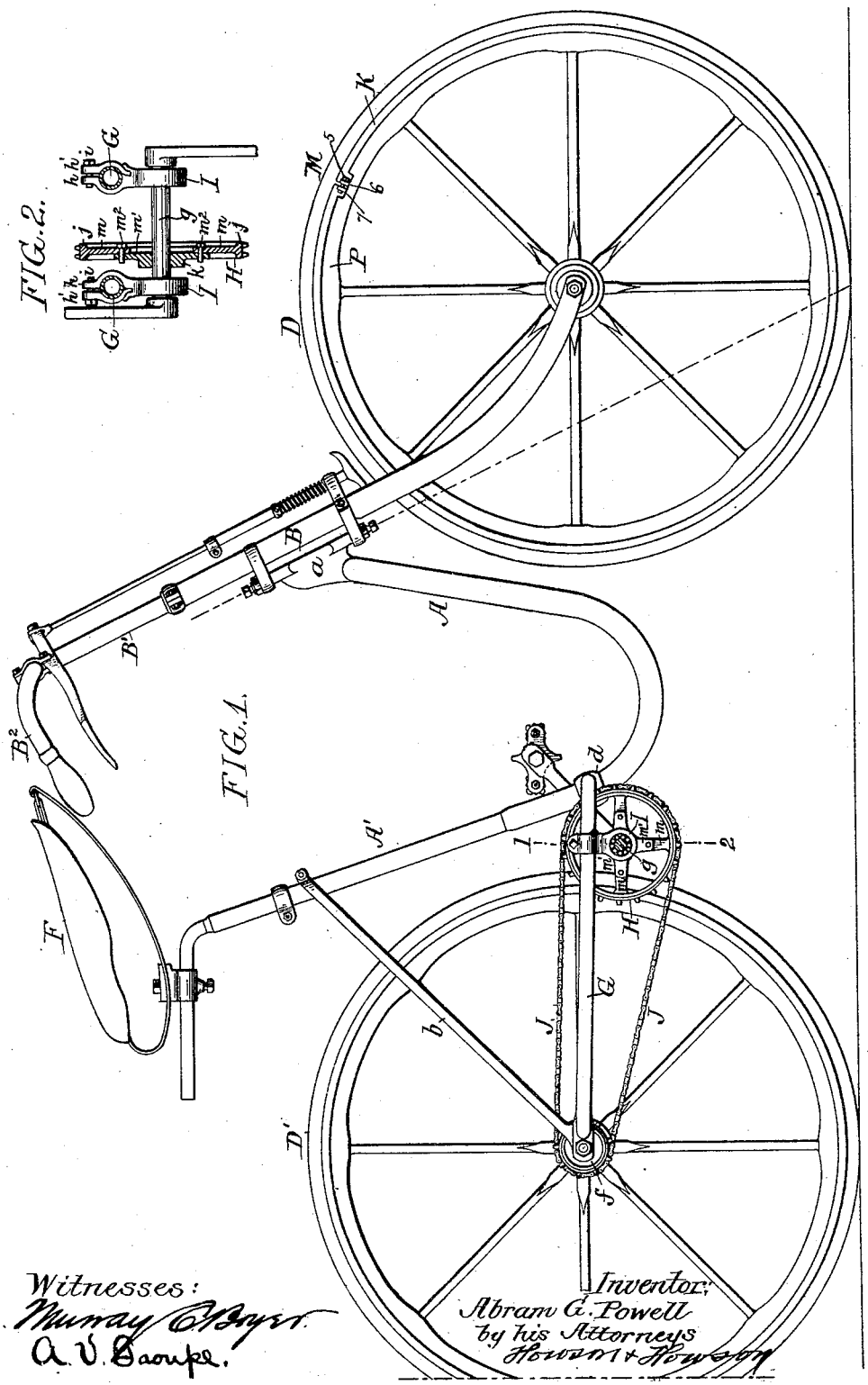

A. G. POWELL.
BICYCLE.

No. 452,649. Patented May 19, 1891.

Witnesses:

Inventor
Abram G. Powell
by his Attorneys
Howson & Howson (No Model.) 3 Sheets—Sheet 3.
A. G. POWELL.
BICYCLE.
No. 452,649. Patented May 19, 1891.
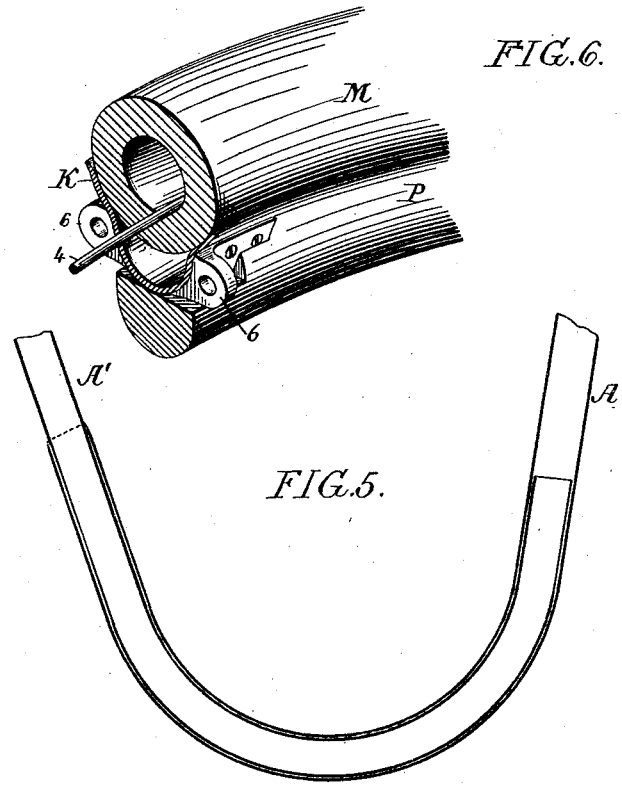
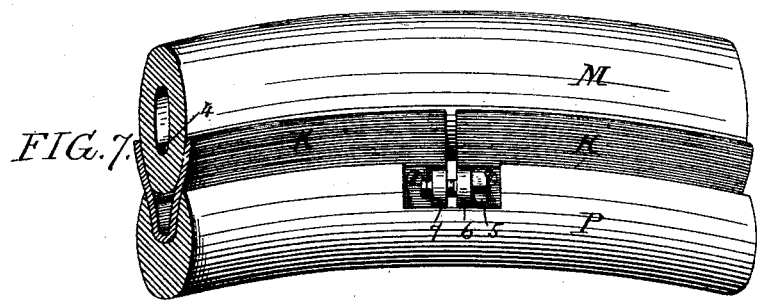
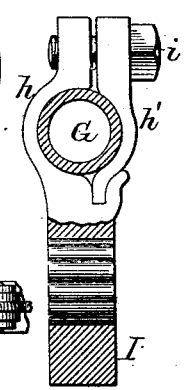
Witnesses:
Inventor:
Abram G. Powell
by his Attorneys
Howson & Howson

UNITED STATES PATENT OFFICE.

ABRAM G. POWELL, OF PHILADELPHIA, PENNSYLVANIA.

BICYCLE.

SPECIFICATION forming part of Letters Patent No. 452,649, dated May 19, 1891.

Application filed November 21, 1890. Serial No. 372,190. (No model.)

*To all whom it may concern:*

Be it known that I, ABRAM G. POWELL, a citizen of the United States, and a resident of Philadelphia, Pennsylvania, have invented certain Improvements in Bicycles, of which the following is a specification.

My invention consists of certain improvements mainly intended for that class of bicycles in which power is applied to the rear wheel by means of chain-gearing from a crank-shaft in front of the wheel, the detailed features of my invention and the objects of the same being fully described hereinafter, and the special features of novelty involved in the invention being fully set forth in the claims.

Figure 3:
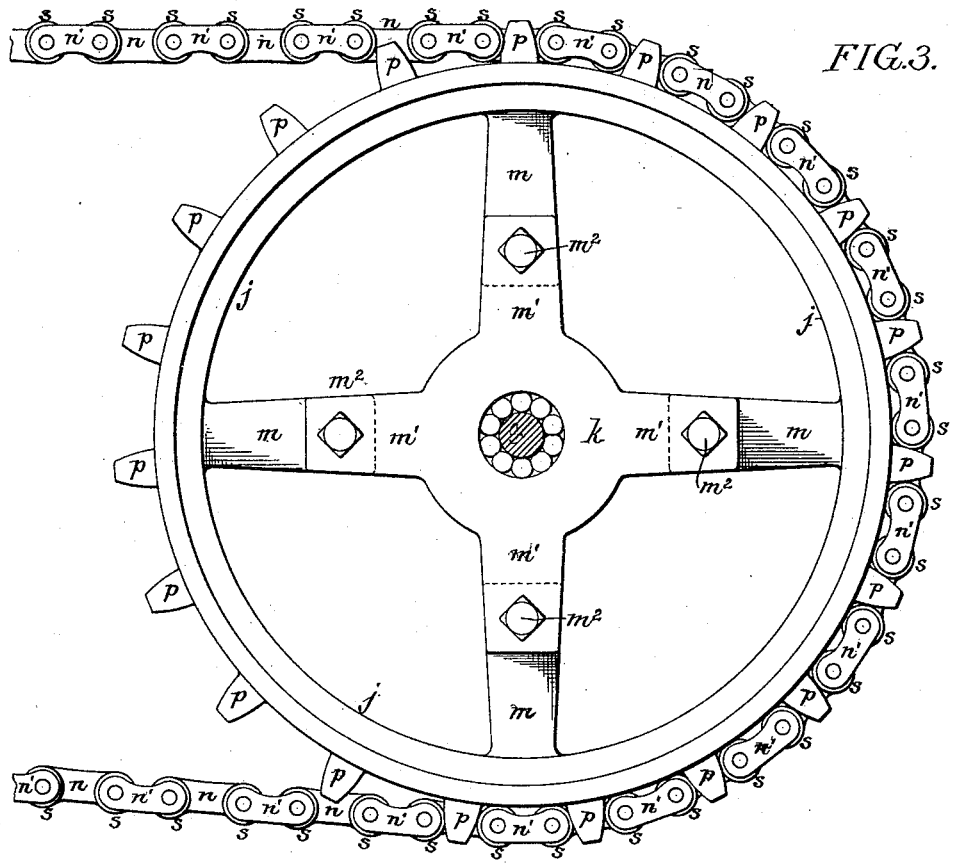
Figure 4:
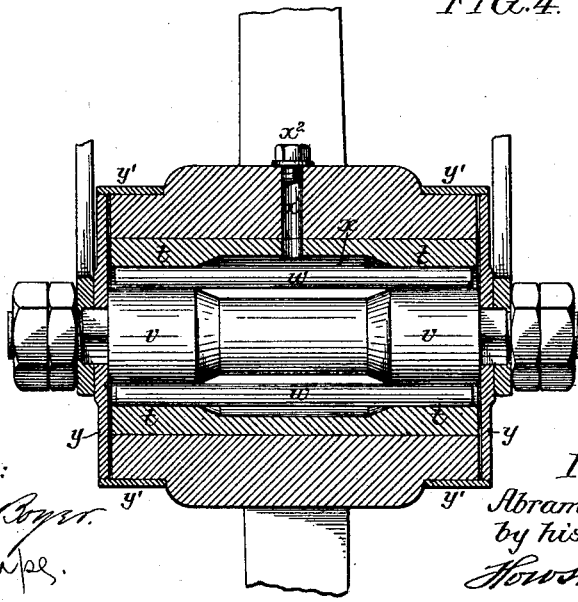

In the accompanying drawings, Figure 1 is a side view of a bicycle constructed in accordance with my invention, the crank on the near side of the bicycle being removed in order to show the crank-shaft bearing. Fig. 2 is a view, partly in elevation and partly in section, on the line 1 2, Fig. 1, and on a somewhat larger scale. Fig. 3 is an enlarged side view of the sprocket-wheel on the crank-shaft. Fig. 4 is an enlarged transverse section of one of the wheel-bearings. Fig. 5 is an enlarged section of part of the frame of the machine. Figs. 6 and 7 are respectively a sectional perspective view and a side view of part of the felly, rim, and tire of one of the wheels. Fig. 8 is an enlarged transverse section of one of the crank-shaft bearings, and Fig. 9 is an edge view of part of the drive-chain.

The central frame of the machine is U-shaped, the front leg A of the frame terminating in a steering-head $a$, to which is hung on suitable centers the steering-bar B, forked at its lower end for the reception of the front wheel D, and having at the top the extension-bar B', provided with the steering-handles B², as usual. The upper and lower centers of the steering-head $a$ are, however, in an angular plane, which if prolonged downward, as shown by the dotted line in Fig. 1, would strike the ground at the point of bearing thereon of the front wheel D—that is to say, at a point directly beneath the axis of the wheel—so that this point of bearing never varies in the steering of the machine, the consequence being that the front of the machine is always supported at the same distance from the ground, no matter how sharply the machine may be turned to the right or left, whereas if a line prolonged through the upper and lower axes of the steering-head strikes the ground in front or rear of the bearing-point of the front wheel a rising and falling motion of the front of the machine results from the steering.

The rear leg A' of the U-frame supports the saddle F, and is connected by a diagonal brace $b$ to the axle of the rear wheel D' of the machine, and to the opposite ends of said axle are also connected the rear ends of a forked frame G, the front end of which has a hub or boss $d$ secured to the upwardly-projecting portion at the rear of the bent lower end of the front leg A of the U-frame. This frame is constructed in the manner shown in Fig. 5—that is to say, the tube A, constituting the front leg of the frame, is so much larger in diameter than the tube A', constituting the rear leg of the frame, that the latter will fit snugly within the bore of said tube A, and before the frame is bent the tube A' is inserted for a considerable distance into the tube A and firmly secured therein by brazing or otherwise, so that after the frame is bent that portion of the tube A' which is within the tube A will extend through the bend and some little distance up into the front leg of the frame. By this means each of the tubes may be comparatively light, as the straight portions of the frame are not subjected to severe strain, while in the bent portion of the frame, where the strains are greatest, there is a double thickness of tube to resist such strain.

Secured to the hub of the rear wheel D' is a sprocket-wheel $f$, which is connected by a chain J to the sprocket-wheel H on the crank-shaft $g$, said shaft being adapted to bearing-boxes I, suspended from the opposite limbs of the rear-wheel fork G, the sprocket-wheel being located within said fork while the cranks are outside of the same. By this means a bearing on each side of the sprocket-wheel is provided and the crank-shaft is much more firmly supported than when a single bearing only located between the sprocket-wheel and one of the cranks is employed, as usual, it being obvious that the shaft is best supported when it has a bearing near each end and close to the crank.

Each box I is preferably provided with rollers forming an anti-friction bearing or support for the crank-shaft, and by preference each box has also formed in one piece with it one half $h$ of a clamp, whereby the box is secured to the bar of the fork G, the other half $h'$ of the clamp being preferably adapted at its lower end to a recess in the upper end of the box I, as shown in Fig. 8, so that a slight swinging movement of this half of the clamp is permitted in order to provide for the securing of the same to or its release from the bar of the fork G by the manipulation of a bolt $i$, which connects the two halves of the clamp at a point above the bar.

It will be evident that the boxes I can be readily moved on the fork G toward or from the axis of the rear wheel D', so as to loosen or tighten the chain J, and in order to provide for readily changing the diameter of the sprocket-wheel H so as to vary the proportions of the gearing constituting part of the driving mechanism the toothed rim $j$ of said wheel is separate from the hub $k$ of the same, the rim having a series of inwardly-projecting half-spokes $m$ and the hub having a corresponding series of outwardly-projecting half-spokes $m'$, as shown in Fig. 3, the half-spokes of one part being adapted to overlap those of the other part, so that when these overlapping portions are secured together by bolts or set-screws $m^2$ a wheel will be produced which, while possessing the necessary strength, permits the ready substitution of one rim portion for another, so that the diameter of the wheel H in respect to that of the wheel $f$ can be readily varied to accord with the character of gearing desired.

The chain J is composed of alternate single links $n$ and double links $n'$, and the teeth $p$ of the sprocket-wheel are recessed in the center, so as to span the single links, as shown in Fig. 9; but as the links are usually made of comparatively soft iron or steel it is not advisable that the teeth should drive the chain by direct contact with the ends of the opposite bars of the double links $n'$. Hence I interpose between the single central links and the side bars of the double links at each end of the latter hardened steel washers $s$, which project slightly beyond the ends of the links $n'$, and thus form bearings for the teeth $p$ and prevent the rapid wear of the chain. By recessing the teeth of the sprocket-wheel so as to permit them to span the single central links of the chain, the weight of said wheel is materially reduced, and the weight of the chain is also reduced, owing to the fact that the distance laterally between the side bars of the double links is much less than when the tooth of the wheel fits between the bars of the double links, as usual, thus effecting a corresponding reduction in the width or number of filling-washers necessary at the ends of the links.

The hub of each of the wheels D D' has a journal-box $t$, recessed in the center, as shown in Fig. 4, and each of the axles $v$ is likewise recessed in the center, as there shown, so that bearing-collars are formed at each end of the journal-box and axle. The internal diameter of the bearing-collars of the journal-box is somewhat greater than the diameter of the collars on the axle, so as to provide for the introduction of rollers $w$, which thus constitute an anti-friction bearing for the wheel, the contracted collars at the ends of the axle and journal-box limiting the bearing-surface, and also serving to form a central oil-chamber $x$, into which oil can be introduced through a passage $x'$, closed at the outer end by a screw stud or cap $x^2$. The axle has at each end a washer-plate $y$, preferably of such diameter as to fit snugly to the end rings $y'$ of the hub, and thus prevent the access of dust or dirt to the bearing.

For the sake of lightness and economy I prefer to make the wheels D D' with wooden hubs, spokes, and fellies; but to the felly of each wheel I apply a grooved metal rim K, the felly P being grooved exteriorly to receive the central portion of this rim, and to the latter is secured the rubber tire M, which is preferably hollow, so as to form a cushioned tire for the wheel, this tire being secured by means of an internal wire 4, or in any other convenient manner.

The metal rim K is split at one point in order that it may be expanded, so as to fit over the grooved wooden felly of the wheel, and afterward clamped to said felly, so as to enter the groove of the same, and thus resist lateral displacement, this clamping of the rim being effected by means of a set-screw 5 passing through a lug 6 formed on or secured to the rim at one end of the same, said bolt engaging with a threaded opening in a lug 7 on the rim at the opposite end of the same, as shown in Fig. 7.

The wooden felly P of the wheel is preferably recessed on each side down to the bottom of the groove for the reception of the lugs 6 and 7 and securing-bolts 5, thereby preventing excessive lateral projection of said lugs and bolts.

The general features of my improved bicycle, therefore, may be summed up as lightness and cheapness of construction, safe and steady steering, ease of running, steadiness and strength of frame and driving-gear, and facility for readily varying the proportions of the wheels of said driving-gear.

Having thus described my invention, therefore I claim and desire to secure by Letters Patent—

1. The within-described U-frame for bicycles, the same consisting of front and rear tubes, one of less diameter than the other and extending into the same throughout the bent portion thereof, so as to provide a double thickness of the tube at the bend of the frame, substantially as specified.

2. The combination of the main frame, the rear wheel, and the fork carrying the latter, with a crank-shaft and bearing-boxes for the opposite ends of said shaft secured to and depending from the opposite arms of said rear-wheel fork, substantially as specified.

3. The combination of the main frame, the rear wheel, and the fork carrying the latter, the crank-shaft, bearing-boxes for the opposite ends of the same, and clamps whereby said boxes are secured to the opposite arms of the fork, substantially as specified.

4. The combination of the journal and axle box, each recessed centrally so as to form end-bearing collars, and intermediate oil-chamber, with the rollers interposed between the journal-box and axle, but unconfined laterally by said box, and constituting an anti-friction bearing for the end collars of the axle, substantially as specified.

5. The combination, in a bicycle-wheel, of the grooved wooden felly of the wheel, the tire, and the interposed metal rim split for application to the grooved felly and provided with clamping devices for confining it thereto, substantially as specified.

6. The combination, in a bicycle-wheel, of the grooved metal rim of the wheel, split as described, and having projecting lugs and clamp-screws, with the wooden felly of the wheel grooved for the reception of said metal rim and recessed laterally for the reception of the lugs and clamp-screws of the same, substantially as specified.

In testimony whereof I have signed my name to this specification in the presence of two subscribing witnesses.

ABRAM G. POWELL.

Witnesses:
EUGENE ELTRICH,
HARRY SMITH.